United States Patent [19]
Gilbert

[11] 3,835,418
[45] Sept. 10, 1974

[54] STABILIZED ALTERNATING CURRENT SOURCE

[75] Inventor: Roswell W. Gilbert, New York, N.Y.

[73] Assignee: RFL Industries, Inc., Boonton Township, N.J.

[22] Filed: Oct. 17, 1972

[21] Appl. No.: 298,257

[52] U.S. Cl.................. 331/141, 331/110, 331/183
[51] Int. Cl. ............................................ H03b 3/02
[58] Field of Search...... 307/304, 261; 331/36, 109, 331/110, 140, 141, 182, 183

[56] References Cited
UNITED STATES PATENTS

| | | | |
|---|---|---|---|
| 2,820,903 | 1/1958 | Roulston et al....................... | 331/60 |
| 2,968,738 | 1/1961 | Pintell................................ | 331/109 |
| 3,084,294 | 4/1963 | Vallese .............................. | 331/109 |
| 3,127,577 | 3/1964 | Lapointe............................. | 331/141 |
| 3,131,312 | 4/1964 | Putzrath.......................... | 307/304 X |
| 3,378,791 | 4/1968 | Towner.............................. | 331/183 |
| 3,432,774 | 3/1969 | Fick.................................. | 331/183 |
| 3,660,768 | 5/1972 | Dammann et al. ................. | 307/261 |

*Primary Examiner*—Ronald L. Wibert
*Assistant Examiner*—Richard A. Rosenberger
*Attorney, Agent, or Firm*—Curtis, Morris & Safford

[57] ABSTRACT

An extremely stable and accurate d.c. source such as a standard cell is used to control very precisely the magnitude of an a.c. voltage produced by an oscillator. The oscillator output is rectified by means of a full-wave rectifier, and is compared with the voltage of the d.c. standard. Any difference between the standard and the rectified value of the oscillator voltage is integrated by an integrator circuit with a relatively long time constant, and then is used to drive a circuit which controls the "Q" of the oscillator by negative feedback. This precisely regulates the magnitude of the oscillator output. Preferably, the "Q" control circuit includes at least one field effect transistor (FET) connected in a bridge network. The FET is used as a voltage-sensitive, relatively distortion-free resistor. In the preferred embodiment of the invention, a "biquad" oscillator is used to produce three output voltages, the phases of which are separated by 90°. Amplitude of the output voltages is controlled with a high degree of precision by means of the technique described above, except that the "Q" control circuit uses two FET bridge circuits connected in push-pull.

13 Claims, 6 Drawing Figures

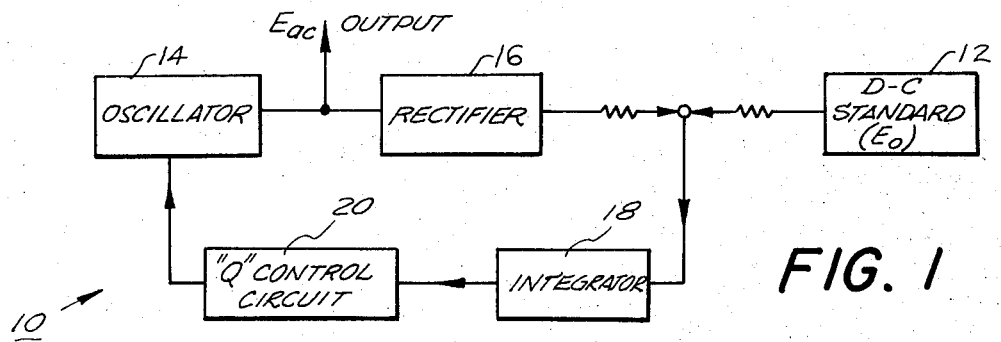
FIG. 1
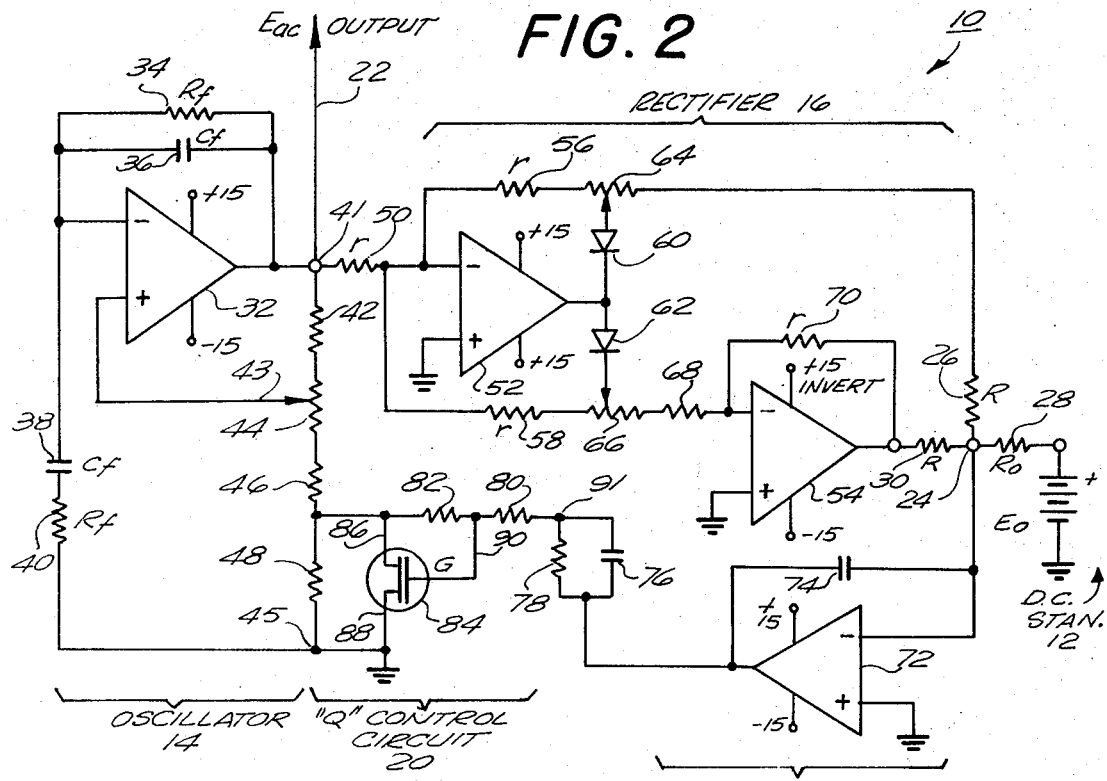
FIG. 2
FIG. 4
FIG. 3
FIG. 5

STABILIZED ALTERNATING CURRENT SOURCE

This invention relates to stabilized alternating current sources, and includes an invention relating to voltage-variable resistors, particularly to resistors formed by field effect transistors.

The need for very accurate d.c. and a.c. voltage sources has existed for quite some time. The need for d.c. sources with stable output voltages has been met by the provision of such circuits as zener diode controlled sources certified to an accuracy of 10 parts per million by reference to a so-called "standard cell." The output voltage of such cells is very stable and is known with a high degree of accuracy. However, a highly precise a.c. source has remained very elusive. Various a.c. sources using thermistors have been proposed, but such sources are sensitive to temperature changes and other errors. Certain other circuits have been proposed which have generally unsatisfactory degrees of precision. Many prior circuits also cause distortion of the output waveform and are undesirable for the purposes of the present invention.

It is an object of the present invention to provide an alternating current source which produces an output whose R.M.S. value is highly precise and accurate. It is an object to use an available highly accurate d.c. source as a reference for this purpose. Furthermore, it is an object of the invention to provide such a source which is relatively compact and simple, and which uses modern solid-state electronic components, thus being relatively rugged. It also is an object to provide such a source whose output waveform is sinusoidal with a high degree of precision.

The foregoing objects are met by the provision of a stabilized alternating-current source which uses a stable d.c. reference source to regulate the output voltage of an oscillator. The output of the oscillator is rectified and integrated, and the rectified and integrated signal is compared with that of the d.c. source. Any difference between the two is used as a negative feedback signal to control the amplitude of the output of the oscillator. In one form of the invention, three different outputs are produced which differ in phase by 90° from one another. The phase difference between the three signals is maintained with a high degree of precision.

It is a further object of the present invention to provide a voltage-sensitive resistor; a resistor which is relatively distortion-free, and is very compact and suitable for use in the a.c. reference sources described above.

This further object of the invention is met by the provision of a field effect transistor whose gate electrode is positioned substantially symmetrically with respect to the channel contacts, and a voltage divider arrangement is connected between the channel contacts. The gate electrode is connected to the mid-point between the resistors of the voltage divider, thus forming a balanced bridge circuit with the resistances between the channel contacts and the gate being in separate arms of the bridge.

The foregoing and other objects and advantages of the invention will be described in and/or apparent from the following description and drawings:

In the drawings:

FIG. 1 is a schematic block diagram of one embodiment of the invention;

FIG. 2 is a detailed schematic diagram of the circuit shown in FIG. 1;

FIG. 3 is a schematic circuit diagram of another embodiment of the invention;

FIG. 4 is an explanatory equivalent circuit diagram of a portion of the circuit shown in FIG. 2;

FIG. 5 is a schematic drawing of a field effect transistor of the circuit of FIGS. 1 through 4.

Figure 6:
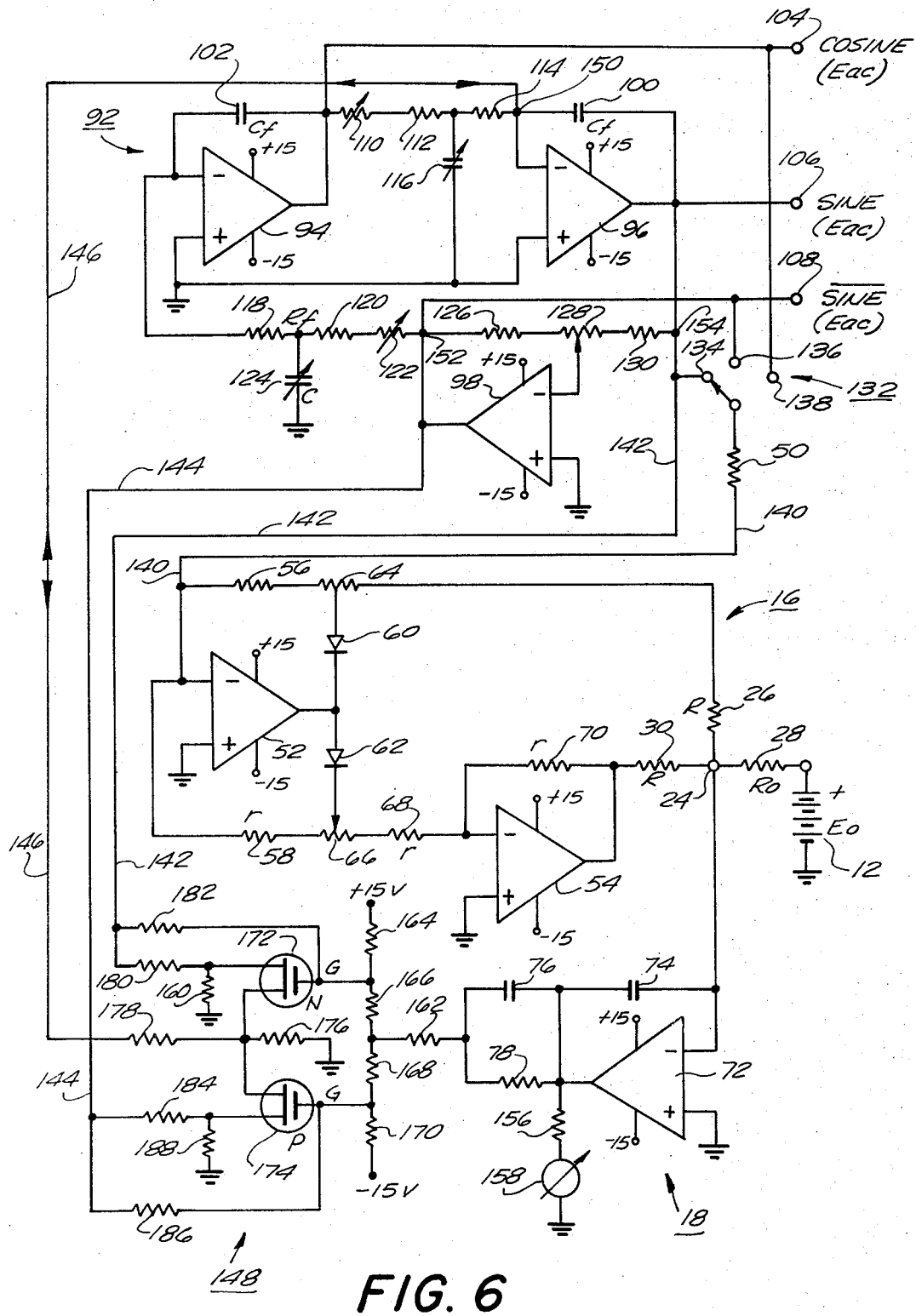
FIG. 6 is a schematic circuit diagram of the preferred embodiment of the invention.

The stabilized a.c. reference source 10 shown in FIGS. 1 and 2 includes a d.c. standard source 12 such as a standard cell, and an oscillator 14. A full-wave rectifier 16 rectifies the output of the oscillator and sends it through a resistor 26 to a summing node 24. The rectifier output has a polarity which is opposed to that of the voltage presented at the node 24 through a resistor 28 from the d.c. standard 12. Any difference between the two voltages at node 24 is sent to an integrator 18 which has a relatively long time constant. The output of the integrator 18 is sent to a "Q" control circuit 20 which sends a positive feedback signal to the oscillator 14 to precisely regulate the "Q" of the oscillator and thus regulate the magnitude of its output voltage. The precisely-regulated output voltage $E_{ac}$ appears on an output lead 22 at the output of the oscillator 14.

Referring now to FIG. 2, the oscillator 14 is one of a number of oscillators which is capable of attaining a Q factor of infinity. The Q factor of the oscillator is the ratio of the reactance of the circuit to its resistance, X/R. Preferably the oscillator is a Wien bridge oscillator with a high-gain integrated differential amplifier 32 to supply the circuit losses and sustain the oscillations of the oscillator, thus giving the oscillator a Q of infinity. When the Q factor of the oscillator thus equals infinity, the magnitude of the output voltage neither increases nor decreases; i.e., it remains stable.

The parallel combination of a resistor 34 and a capacitor 36 forms one of the four arms of the Wien bridge oscillator 14. A series-connected resistor 40 and capacitor 38 form another arm of the bridge. A third arm is formed by the resistor 42 and a portion of the resistance of a potentiometer 44 whose wiper arm is connected to the non-inverting (+) input terminal of the differential amplifier 32. The final leg of the bridge circuit is formed by the remainder of the resistance of the potentiometer 44, two series-connected resistors 46 and 48, and the Q control circuit 20. As will be explained in greater detail below, the Q control circuit 20 effectively changes the resistance of this final leg of the Wien bridge so as to control its output voltage quite accurately.

The regulated output voltage $E_{ac}$ of the oscillator 14 is delivered over the output lead 22. The output of the oscillator also is delivered through a resistor 50 to the rectifier 16. The rectifier 16 is an operational rectifier; that is, it uses the high input impedance and other characteristics of operational amplifiers to provide accurate and precise rectification of the output of the oscillator 14. Preferably, the rectification is full-wave.

The output of the oscillator is delivered to the inverting (−) input terminal of a first high-gain operational amplifier 52. The output of amplifier 52 is delivered to the anode of a diode 62 and the cathode of a second diode 60. A first feedback loop for the amplifier 52 is provided by the diode 60, a trim potentiometer 64, and a resistor 56. A second feedback loop for the amplifier 52 is provided by the diode 62, the potentiometer 66, and a resistor 58. The negative-polarity portions of the sinusoidal wave reaching the rectifier 16 are delivered to the summing node 24 through a resistor 26. Positive polarity portions of the wave are delivered to the node 24 through the diode 62, the potentiometer 66, a resistor 68, an inverting operational amplifier 54, and another resistor 30. Thus, the output of the oscillator is fully rectified by the rectifier 16, with the polarity of the signal from the rectifier 16 being opposite to and "bucking" that of the standard source 12. Any difference between the two signals is delivered to the integrator 18.

The integrator preferably is composed of another high-gain operational amplifier 72 with a feed-back capacitor 74. The time-constant of the integrator 18 preferably is relatively long. Thus, the integrator 18 serves to smooth and remove the ripple from any difference signal which it receives.

The output of the integrator flows through a damping circuit consisting of a parallel-connected resistor 78 and capacitor 76. The Q control circuit 20 includes series-connected resistors 80 and 82, and field effect transistor (FET) 84. The FET 84 is a MOS FET which has channel contact electrodes 86 and 88, and a gate electrode 90. The channel of the FET is connected in parallel with the resistor 48. The gate electrode 90 is connected to the junction between the resistors 80 and 82, and the right-hand terminal of resistor 80 is connected to the junction 91 of resistor 78 and capacitor 76. Because the capacitor 76 has a relatively high capacitance, the point 91 is effectively at ground to a.c. signals. The electrode 88 of the FET 84 is grounded.

In accordance with one aspect of the present invention, the circuit described above forms, in essence, a balanced a.c. bridge in which the distributed channel resistance of the FET is divided in half and each half is located in one of two sequential arms of the bridge. The other two resistances in the bridge are formed by the resistors 80 and 82. Preferably, the resistors 80 and 82 are identical to one another. As it has been noted above, the point 91 at the output of the resistor and capacitor combination is essentially at ground, thus completing the bridg circuit.

FIG. 4 shows the a.c. bridge circuit described above. The channel is represented by the resistor 95. The application of a.c. from the oscillator 14 is represented by the a.c. source 97. The resistors 80 and 82 are approximately equal. They are selected so that the bridge is balanced when the a.c. source 97 is applied between the channel contacts.

The function of the Q control circuit is to vary the total resistance in the arm including resistors 46 and 48, thus controlling the amplitude of the output voltage of the Wien bridge oscillator 14. The resistance of the resistor 48 and the average resistance of the FET 84 preferably are about equal.

FIG. 5 is a schematic representation of the FET 84. The FET is formed from a wafer 107 of silicon, and includes a diffused "N" channel 95. A MOS gate is formed by an extremely thin layer 103 of silicon oxide covered by a thicker layer 105 of metal, to which the gate lead 90 is bonded. The layers 103 and 105 are shaped and located symmetrically with respect to the channel 97. Metal channel contacts 99 and 101 are located at opposite ends of the channel and provide ohmic inlet and outlet contacts to the channel. The contacts 99 and 101 are located symmetrically with respect to the gate electrode. Thus, a symmetricalelectrode MOS FET is provided. When connected in the balanced bridge circuit of FIGS. 2 and 4, the voltage drops across the two halves of the channel change symmetrically with varying input voltages, thus minimizing waveform distortion.

The amplitude of the output of the oscillator 14 is determined by the ratio of the resistance between points 41 and 43 and the resistance between points 43 and 45. This ratio can be adjusted by means of the potentiometer 44. Thereafter, the resistance between the wiper arm 43 of the potentiometer 44 and point 41 remains constant, while the resistance between points 43 and 45 varies in the manner described above in order to maintain a stable output amplitude.

When all of the resistors labeled with "r" in FIG. 2 are equal in resistance, the following equation describes the relationship between the a.c. output voltage $E_{ac}$ and the reference voltage $E_o$:

$$E_{ac} = E_o (R/R_o) (\pi/2 \sqrt{2}) \qquad (1)$$

In which:

$E_{ac}$ is the root-mean-square value of the alternating output voltage at terminal 22;

$E_o$ is the output voltage of the direct current standard 12;

R is the resistance of resistors 26 and 30; and $R_o$ is the resistance of resistor 28.

$(\pi/2 \sqrt{2})$ is the "form factor" determining the RMS value of a sinusoidal wave.

Because of its relatively high Q factor, the oscillator acts as a loop integrator. The capacitor 76 and resistor 78 form a partial differentiating circuit tending to damp oscillations which might be caused by transients acting together with the integration of the feedback integrator 12 and the oscillator.

FIG. 3 illustrates the added components of an alternative embodiment of the invention in which the a.c. output is taken from a terminal 73 instead of the terminal 22. Most of the circuit shown in FIG. 2 has been omitted from FIG. 3 for the sake of simplicity.

The a.c. output is developed by inverting one of the half-wave output signals of the operational rectifier 16 and re-combining it with the other half-wave signal so as to reconstitute the a.c. signal. The potential advantage in this alternative arrangement is that it can reduce the number of resistors and operational amplifiers which must be verified and trimmed in the operational rectifier 16. With the arrangement shown in FIG. 3, only the operational amplifier 71 and its associated resistors need be trimmed and verified.

The non-inverting terminal of the amplifier 71 is connected to a potentiometer 85, and a resistor 87 to the terminal 93 to sense one of the half-wave signals. The inverting lead of the amplifier 71 is connected through a potentiometer 79 and resistor 81 to the terminal 89 where the other half-wave signal is sensed.

PREFERRED EMBODIMENT

The embodiment of the invention shown in FIG. 6 is similar to that shown in FIGS. 1 and 2, except that it produces three a.c. output signals on terminals 104, 106, and 108 which are separated from one another in phase by 90°, and it gives an even more precisely controlled a.c. output. The phase separation also is maintained with a high degree of precision. A signal proportional to the sine of the output wave is produced on terminal 106, and the cosine signal is produced on terminal 104. An inversion of the sine signal appears on terminal 108. Thus, the signal on terminal 108 lags the signal on terminal 106 by 180°, while the signal on terminal 104 lags the signal on terminal 106 by 90°, thus providing a symmetrical 90° separation between the three signals.

The circuit shown in FIG. 6 includes a so-called "biquad" or "state-variable" oscillator 92, the operational recitifer 16, the standard d.c. source 12, the integrator 18, and a Q control circuit 148. As in the previous embodiments, an output signal of the oscillator is transmitted to the rectifier 16 where it is rectified and compares with the output of the standard source 12. Any difference voltage is integrated by the integrator 18, and operated upon by the Q control circuit 148 to precisely control the amplitude of the output signal. A three-position switch 132 is provided to make contact with one of the three output signals to be delivered over conductor 140 to the operational rectifier. Of course, if it is desired to regulate all three output signals simultaneously, identical regulation circuits can be provided for each of the three output signals.

The biquad oscillator 92 is well known and long has been used in analog computers. Therefore, it will not be described in great detail. Two integrators are provided. One integrator consists of an operational amplifier 94 and a capacitor 102, and the other consists of an operational amplifier 96 and a capacitor 106. Variable capacitors 116 and 124 and variable resistors 110 and 122 are provided for trim purposes. Additional trim resistors 112, 114, 118 and 120 are provided. An additional operational amplifier 98 serves as an inverter, together with a trim potentiometer 128, and gain-determining resistors 126 and 130.

The amplitude of the output signals can be controlled by the application of a negative feedback signal over the line 146 which is connected to the inverting input terminal of amplifier 96. The inverter amplifier 98 is trimmed so that it has a gain of precisely-1.0. The capacitors 100 and 102 should be selected so as to track with temperature changes. The small parallel capacitors 116 and 124 are used to compensate for the intrinsic loss angle of the capacitors 102 and 100.

The operational rectifier 16 and integrator 18 are identical, respectively, to the circuits bearing the same reference numerals in FIG. 2 and will not be described further here. The damping circuit including the capacitor 76 and resistor 78 is the same as in FIG. 2. A d.c. voltmeter 158, which includes a resistor 156, is connected to the output of the integrator 18 to indicate the feedback level. This feedback level should be approximately zero under steady-state conditions.

The Q control circuit 148 includes a pair of complementary field effect transistors 172 and 174 connected in a push-pull configuration. FET 172 is a nitrided-gate N-channel MOS device, whereas FET 174 is the same except that it is a P-channel device. The push-pull circuit has the effect of differentially adjusting the resistances between point 150 and 152 and 150 and 154, and sending a feedback signal over line 146 to compensate for amplitude variations in the output wave.

The Q control circuit 148 includes a coupling resistor 162, and a bias network consisting of resistors 164, 166, 168 and 170 connected between a +15v. and −15v. source. This network provides a bias of approximately +1.5 volts on the gate lead of FET 172, and a bias of about −1.5 volts on the gate lead of FET 174.

Each FET is connected in a balanced bridge network similar to that in which the FET 84 of FIG. 2 is connected. The bridge network for FET 172 has a resistance 182 in one arm which is connected to its gate lead. The other bridge arm connected to the gate lead consists of the equivalent resistance of the a.c. network including resistors 166, 162 and capacitor 76 and its a.c. path to ground. A third arm of the bridge consists of the combination of resistors 180 and 160, which is connected to one of the symmetrically-positioned channel contacts of the FET 172. The fourth arm, which is connected to the other channel contact of the FET 172, consists of the combination of resistors 176 and 178 and the equivalent resistance through path 146 to ground. An identical balanced bridge is provided for the FET 174 by the resistors 184, 186, 188, 176, 178, etc. The bridges are balanced most easily by connecting a series pair of equal resistors across the channel, applying an a.c. signal between the junction of transistors 180 and 182 or 184 and 186, and adjusting the value of resistor 182 or 186 until the voltage drops in each arm of the resulting bridge circuit are the same.

Lines 144 and 142 are connected to the two output leads of the FETs. Line 144 is connected to point 152 in the oscillator 92, and line 142 is connected to point 154 in the oscillator. The voltages at points 152 and 154 are 180° out of phase, thus providing for push-pull operation of the FETs.

The push-pull output created by any error voltage received from the integrator 18 is delivered over line 146 to adjust precisely the output voltage on the lead 104, 106 or 108 which is enabled by operation of the switch 132. Equation (1) above describes the relationship between the magnitude of the voltage $E_{ac}$ at each terminal 104, 106 or 108 and the reference voltage $E_o$.

The use of the push-pull Q control circuit makes it possible to control the amplitude of the output even more precisely than in the circuit of FIG. 2, in which a single-ended circuit is provided. The push-pull circuit further reduces distortion of the voltage waveform, and is very insensitive to sources of error. The bridge-circuit connections of each FET help to minimize distortion.

Devices having the circuits shown in FIGS. 1 and 2 and 6 have been built and operated successfully. The devices met the objectives stated above, and particularly were found to give a highly stable a.c. output voltage. In fact, in the circuit of FIG. 2, the output voltage remained accurate to 1/1000 of 1 percent for a period of several hours. The output was held constant with an accuracy of 1/100 of 1 percent for a much longer period of time, and that accuracy is believed to be maintainable for as long as the d.c. standard source remains constant. Any distortion which might have appeared in the waveform of the output voltage was so small as to be unmeasurable with test techniques presently available. Thus, the output of the Wien oscillator, which is known for its waveform purity, is not adversely affected by the precise amplitude control provided by the present invention.

The accuracy of the circuit of FIG. 6 was even better, as was the waveform purity. The accuracy of phase separation of the multi-phase outputs was similarly good.

The following table lists the values and identities of the circuit components used in the circuits which were tested and operated:

| Circuit Component | Description |
|---|---|
| Amplifiers 52, 54, 72, 94, 96, 98 | Model 234 Operational amplifiers, chopper stabilized, sold by Analog Devices, Inc. |
| Amplifier 32 | Model 146 Operational Differential Amplifier, Chopper Stabilized, sold by Analog Devices, Inc. |
| Resistors 34 and 40 | |
| Resistors 50, 56, 58, 68 and 70 | 5,000 ohms |
| (All resistors marked with "r") | |
| Resistors 26 and 30 | 50,000 ohms |
| Resistor 28 | 88.868 ohms (adjustable per equation 1 to determine magnitude of output voltage) |
| Resistor 42 | 2200 ohms |
| Resistors 112, 114, 118 and 120 | 2,500 ohms |
| Resistors 126 and 130 | 5,000 ohms |
| Resistor 46 | 4700 ohms |
| Resistor 156 | 10,000 ohms |
| Resistor 48 | 470 ohms |
| Resistors 166 and 168 | 10,000 ohms |
| Resistor 162 | 47,000 ohms |
| Potentiometer 44 | 1000 ohms |
| Potentiometer 110 and 122 | ~50 ohms |
| Potentiometer 128 | 100 ohms |
| Field Effect Transistor 84 | RCA 3N153 N-Depletion MOS-FET. A symmetrical junction FET also can be used. |
| Field Effect Transistor 172 | Motorola 2N4351 N-Enhancement MOS FET |
| Field Effect Transistor 174 | Motorola 2N4352 P-Enhancement MOS FET |
| Resistors 80 and 82 | 27,000 ohms |
| Resistors 182 and 186 | 10 Megohms |
| Resistor 78 | 220,000 ohms |
| Resistors 164, 170, 180 and 184 | 100,000 ohms |
| Capacitors 74 and 76 | 2 microfarads |
| Capacitors 36, 38, 100 and 102 | 0.01 microfarad (for 60 $H_z$) |
| Capacitors 116 and 124 | 10-100 picofarads |
| Diodes 60 and 62 | 1N914 |
| Potentiometers 64 and 66 | 100 ohms |
| d.c. standard 12 | Zener diode controlled reference certified to 10p.p.m. accuracy and having a certified output voltage of 8 volts ± 0.01% |
| Ea.c. | 5 volts r.m.s., ± 0.01% or better |

The above description of the invention is intended to be illustrative and not limiting. Various changes or modifications in the embodiments described may occur to those skilled in the art and these can be made without departing from the spirit or scope of the invention. For example, both of the oscillators 14 and 92 are capable of maintaining a substantially infinite Q factor. Other known oscillators have such a capability and are usable instead of the specific oscillators disclosed above.

I claim:

1. A stabilized alternating current source comprising, in combination, a stable d-c reference source, an electrical oscillator, a full-wave rectifier for rectifying the output of said oscillator, said rectifier including a first high-gain amplifier and a unidirectional conduction device connected to the output of said amplifier, a second high-gain amplifier and a second unidirectional conduction device, the latter being connected to the output of said first amplifier, said second amplifier being connected to invert oscillator signals of one polarity, means for comparing the rectified output voltage of said rectifier with the voltage of said d-c reference source and creating an error signal corresponding to the difference between said voltages, and a variable impedance device responsive to said error signal for adjusting the magnitude of the output signal from said oscillator in a sense such as to reduce said difference.

2. A stabilized alternating current source comprising, in combination, a stable d-c reference source, an electrical oscillator, a rectifier for rectifying the output of said oscillator, means for comparing the rectified output voltage of said rectifier with the voltage of said d-c reference source and creating an error signal corresponding to the difference between said voltages, and a variable impedance device responsive to said error signal for adjusting the magnitude of the output signal from said oscillator in a sense such as to reduce said difference, said variable impedance device comprising a field effect transistor (FET) having a gate electrode which is located substantially symmetrically with respect to its channel electrodes, circuit means forming a bridge circuit with the channel resistance of said FET being divided in half and the halves being located in sequential branches, and matching impedances in the other branches, and means for connecting said bridge circuit to receive said error signal.

3. A source as in claim 2 in which said rectifier is an active rectifier.

4. A source as in claim 3 in which said rectifier includes a high-gain amplifier and at least one unidirectional conduction device connected to the output of said amplifier.

5. A stabilized alternating current source comprising, in combination, a stable d-c reference source, an electrical oscillator, a full-wave rectifier for rectifying the output of said oscillator, means for comparing the rectified output voltage of said rectifier with the voltage of said d-c reference source and creating an error signal corresponding to the difference between said voltages, and a variable impedance device responsive to said error signal for adjusting the magnitude of the output signal from said oscillator in a sense such as to reduce said difference, said variable impedance means including a pair of complementary field-effect transistors (FETs) connected in a push-pull circuit.

6. A source as in claim 5 in which each of said FETs has a gate lead which is located substantially symmetrically with respect to its channel electrodes, circuit means forming a bridge circuit with the channel resistance of said FET being divided in half and the halves being located in sequential branches, and matching impedances in the other branches, and means for connecting said bridge circuit to receive said error signal.

7. A stabilized alternating current source comprising, in combination, a stable d-c reference source, an electrical oscillator, said oscillator including means for giving it a substantially infinite Q factor at which its output amplitude is stable, a rectifier for rectifying the output of said oscillator, means for comparing the rectified output voltage of said rectifier with the voltage of said d-c reference source and creating an error signal corresponding to the difference between said voltages, and negative feedback means utilizing said error signal for maintaining said Q factor at infinity, said negative feedback means including an active integrator with a relatively long time constant for smoothing said error signal, and a balanced-bridge symmetrical FET variable impedance circuit.

8. A source as in claim 7 in which said oscillator is a Wien bridge oscillator and said variable impedance circuit is connected in one arm of the bridge of said oscillator.

9. A source as in claim 7 in which said oscillator is a biquad oscillator.

10. A source as in claim 7 in which said rectifier is a full-wave active rectifier.

11. A source as in claim 7 including a second FET circuit, said FET circuits having complementary FETs connected in a push-pull configuration.

12. A stable multiphase-output source comprising, in combination, a biquad oscillator providing output voltages separated in phase by 90° to 180°, an active rectifier connected to receive one of said output voltages, a stable d.c. reference source, means for comparing the output of said rectifier with that of said d.c. source and producing a difference signal, an active integrator for smoothing said difference signal, a push-pull FET circuit controlling the amplitude-determining impedance of said oscillator in accordance with the smoothed difference signal in a sense such as to reduce said difference signal.

13. A source as in claim 12 in which oscillator voltages separated by 180° in phase from one another are used to energize said push-pull circuit.

* * * * *